United States Patent Office 3,246,995
Patented Apr. 19, 1966

3,246,995
METAL MARKING COMPOSITION
Harry J. Moore, Downey, Calif., assignor to Aerojet-General Corporation, Azusa, Calif., a corporation of Ohio
No Drawing. Filed Feb. 19, 1962, Ser. No. 174,261
10 Claims. (Cl. 106—1)

This invention relates to a novel composition and a method for its use in marking ferrous metal parts so that they can be identified during handling as, for example, in heat treating operations following metal forming operations.

In the manufacturing of ferrous metal parts, it is frequently necessary to heat treat the parts in order to obtain the desired physical properties in the metal. Frequently, the heat treating operation is necessary in order to relieve stresses imparted to the metal parts during forming operations such as stamping, cold working, and machining. The heat treating is accomplished by placing the metal part in a furnace whose temperature is carefully maintained above the temperature at which the stresses are relieved.

In other heat treating operations, metal parts are subjected to heating followed by cooling in order to obtain the desired microstructure in the metal. Thus, for example, when ferrous metal parts are heated to a sufficient temperature and then rapidly cooled, the equilibrium phase changes which occur in slow cooling are inhibited. This results in a microstructure and physical properties which differ markedly from those obtained through equilibrium cooling.

In heat treating ferrous metal objects, it is generally necessary to place a number of them in a single heat treat furnace. This uses the furnace to its full capacity and results in its most economic use. Since the metal parts may have the same shape yet have different compositions, it is necessary to mark the parts in order to distinguish them during and after the heat treat operation.

Prior art compositions used in marking metal parts have been unsatisfactory for several reasons. First, the markings were not sufficiently adherent and had a tendency to flake off during handling of the metal parts. Second, many marking materials formed gases when placed on a ferrous metal object. These gases, believed to be formed from reaction between the marking material and the metal, caused bubbles or blisters to form beneath the marking. When this occurred, the marking did not adhere to the surface and was easily dislodged when the ferrous metal parts were handled.

In view of the problems encountered with prior art marking materials, it is an object of my invention to provide a novel marking composition and a method for its use which composition contains copper sulfate, sulfuric acid, water, and a colloidal material such as polyvinyl alcohol. Additional objects will become apparent from a reading of the specification and claims which follow.

My marking composition contains up to about 20 percent by weight of copper sulfate or its equivalent in the form of the hydrated salt. The upper concentration limit is determined primarily by the concentration of copper sulfate which can be held in solution in the marking composition. The lower limit is not critical and is determined by the kinetics of the reaction which takes place when the marking composition is placed on the ferrous metal surface. As the copper sulfate concentration is decreased, the time required to form the marking is increased. Thus, the lower limit is determined by the time allotted to the marking operation.

The sulphuric acid component is present in a concentration range sufficient to give a pH which is less than about 3.5. This is a critical feature of my invention since a satisfactory coating is not formed when the pH of the marking composition is greater than about 3.5. Although I generally employ concentrated sulfuric acid as the acid component in my marking composition, I can employ other acids such as hydrochloric acid, trichloro acetic acid, and the like. In all cases, however, the acid concentration must be sufficient to give a pH lower than about 3.5.

The colloidal material employed in my composition is present in an effective amount capable of preventing the formation of undue amounts of gas when the coating composition is placed on the ferrous metal surface. Any colloidal material which will form a colloidal solution in water and which is stable in acid medium is satisfactory for purposes of my invention. Typical of such materials are polyvinyl alcohol, methyl cellulose, water soluble gums, starches, casein, gelatine, water dispersible lacquers, etc. The upper concentration limit for the colloidal material is in the order of six percent by weight of the total marking composition. The upper limit is not critical but is determined simply by the amount of colloidal material which the marking composition is capable of holding.

The last component of my coating composition is water or a polar solvent having properties like those of water. The solvent forms the balance of the coating composition. Typical of such solvents are methyl alcohol, certain organic amines, and certain glycols and ketones such as diethylene triamine, triethylene tetramine, diethylene glycol monobutyl ether, 2-ethoxy ethane, acetone, and the like. Water is the preferred solvent because of its cheapness and ready availability.

In addition to the above components in my coating composition, I also employ a wetting agent in some cases to improve the contact between the coating composition and the ferrous metal surface. When so employed, the wetting agent is present in an amount sufficient (up to 0.5 percent by weight) to reduce the surface tension of the coating composition to the order of 32 dynes/cm.$^2$. Typical of such wetting agents are quaternary amines, sodium alkyl aryl sulfonates, polyethylene oxide condensates, and the like. The wetting agent, as illustrated by the above listing, can be cationic, anionic, or nonionic.

When employing my coating compositions, I first clean the ferrous metal surface to which the coating is to be applied. This can be done in a variety of conventional ways such as by acid treatment, machining, or sand blasting. The method which I prefer and generally employ is sand blasting.

In applying the coating composition to the clean ferrous metal surface, I can use any conventional means of application. Thus, I can brush on the coating composition with a marking brush, I can spray it on, or I can apply it by means of a marking pencil type of applicator. My preferred method of application involves use of the marking pencil applicator. When applying the coating in this manner, I place a solution of my coating composition in a plastic bottle which contains a wick that is inserted into the marking composition. The wick extends through the mouth of the bottle and is generally covered by a cap when not in use. To use the marking pencil applicator, I remove the cap and write upon the ferrous surface using the wetted wick which extends from the bottle as the writing implement.

In order to further illustrate the scope of my invention, there are presented the following examples in which all parts and percentages are by weight unless otherwise indicated.

*Example 1*

To 100 milliliters (mls.) of water was added 25 grams (g.) of copper sulfate pentahydrate; 2.7 mls. concentrated sulfuric acid; 5 mls. of a saturated (approximately 30 percent by weight) polyvinyl alcohol-water solution (Du Pont Elvanol PVA, grade 51–05); and 0.1 g. of OT aerosol (dioctyl sodium sulfo-succinate produced by American Cyanamid Co.).

A small portion of this composition was applied to a clean surface of SAE 6434 steel which contains 0.32–0.38 percent carbon, 0.60–0.80 percent manganese, 0.20–0.35 percent silicon, 0.65–0.90 percent chromium, 1.65–2.00 percent nickel, 0.30–0.40 percent molybdenum, 0.17–0.23 percent vanadium, and the balance iron. After making on the surface by applying the composition thereto, the metal specimen was heated at 1300° F. for one hour in an atmospheric furnace (atmosphere not controlled). On cooling, a piece of masking tape was placed over the marking. The masking tape was then pulled from the surface and the marking was found to be completely intact and firmly adherent to the metal surface.

When the composition was applied to SAE 4130 steel which contains 0.28–0.33 percent carbon, 0.40–0.60 percent manganese, 0.80–1.10 percent chromium, 0.15–0.25 percent molybdenum, with the balance iron, an adherent marking was obtained. When this specimen was heated at 1300° F. for one hour in an atmospheric furnace, the coating was found to be unaffected. This was shown by placing masking tape on top of the coating, pulling off the masking tape and finding the coating or marking unaffected.

When Example I was repeated employing marking compositions identical to that of Example I except that they contained a smaller quantity of polyvinyl alcohol, the same results were obtained. Thus, compositions identical to Example I, except that they contained, respectively, 3 mls. of polyvinyl alcohol-water solution, 1 ml. of polyvinyl alcohol-water solution, and 0.5 ml. of polyvinyl alcohol-water solution, gave effective coatings which were not adversely effected by heat treatment at 1300° F. for one hour in an atmospheric furnace. The metal specimens employed in these tests, as in Example I, were composed of SAE 4130 steel and SAE 6434 steel. The polyvinyl alcohol-water solutions were saturated and in each case constituted about 30 percent by weight of polyvinyl alcohol.

Example II

A marking solution was composed by mixing 25 g. copper sulfate pentahydrate, 2.7 mls. of concentrated sulfuric acid, 0.1 g. of a wetting agent (Aerosol OT), 20 mls. of polyvinyl alcohol-water solution (approximately 30 percent PVA), and 100 mls. of water. This composition, when applied to either SAE 6434 or SAE 4130 steel, gave an adherent coating which remained adherent after heat treating the specimen for one hour at 1300° F. in an atmospheric furnace. As in Example I, the adherency of the coatings was determined by placing masking tape over them and stripping off the masking tape.

Example III

A marking composition was composed by adding 20 g. of copper sulfate pentahydrate, 2 mls. of concentrated sulfuric acid, and 20 mls. of polyvinyl alcohol-water solution (approximately 30 percent PVA) to 80 mls. of water. The resulting solution was filtered and applied to specimens of SAE 6434 steel and SAE 4130 steel as in Example I. The marks on the specimens were quite adherent (resistant to stripping off with masking tape) and remained that way after the specimens had been heated for one hour at 1300° F. in an atmospheric furnace.

Example IV

A marking solution was composed by mixing 20 g. of copper sulfate pentahydrate, 20 mls. of polyvinyl alcohol-water solution (30 percent PVA), 2.0 mls. of sulfuric acid, and 100 mls. of water. The resulting solution was filtered and applied to SAE 6434 steel and SAE 4130 steel as in Example I to give markings which were quite adherent (resistant to stripping with masking tape) even after heating at 1300° F. for one hour in an atmospheric furnace.

Example V

A solution was composed by mixing 25 g. of copper sulfate pentahydrate, 2.7 g. of concentrated sulfuric acid, 0.5 ml. of polyvinyl alcohol-water solution (approximately 30 percent PVA), 0.05 g. of wetting agent (Aerosol OT), and 100 mls. of water. This solution was applied to SAE 6434 and SAE 4130 steel specimens as in Example I to give adherent coatings which, after treatment in an atmospheric furnace for one hour at 1300° F., resisted stripping with masking tape.

When the preceding examples are repeated using acids other than sulfuric, e.g., trichloroacetic or hydrochloric acid, satisfactory results are obtained. Also, satisfactory results are obtained when polar solvents other than water are employed.

Example VI

A marking solution was composed by mixing 25 g. of copper sulfate pentahydrate, 5 mls. of polyvinyl alcohol-water solution (approximately 30 percent PVA), 2.5 mls. of concentrated sulfuric acid, and 100 mls. of water. The composition was applied to specimens of SAE 6434 steel and SAE 4130 steel as in Example I to give adherent coatings both before and after heat treatment at 1300° F. in an atmospheric furnace. The adherency, as in the previous examples, was determined by the resistance of the coating to stripping with masking tape.

Example VII

A marking composition was formed by mixing 25 g. of copper sulfate pentahydrate, 2.7 mls. of concentrated sulfuric acid, 5 mls. of polyvinyl alcohol-water solution (approximately 30 percent PVA), 0.03 g. of dioctyl sodium sulfo-succinate wetting agent (Aerosol OT), and 100 mls. of water. The marking composition was applied to specimens of SAE 6434 steel and SAE 4130 steel to give coatings which were resistant to stripping with masking tape both before and after heat treatment at 1300° F. for one hour in an uncontrolled atmosphere.

When the foregoing examples are repeated using colloidal materials other than polyvinyl alcohol or methyl cellulose, e.g., gelatine, water soluble gums, and starches, satisfactory coatings are obtained.

Example VIII

A marking composition was formed by mixing 25 g. of copper sulfate pentahydrate, 2.7 mls. concentrated sulfuric acid, 20 mls. of polyvinyl alcohol-water solution (approximately 30 percent PVA), and 100 mls. of water. The composition was tested using SAE 6434 and 4130 steel specimens in the same manner as in Example I and was found to give adherent coatings both before and after heat treatment at 1300° F. in an uncontrolled atmosphere.

Example IX

A marking composition was formed by mixing 25 g. of copper sulfate pentahydrate, 2.7 mls. of concentrated sulfuric acid, 0.1 g. of methyl cellulose (Dow Methocel), and 100 mls. of water. The composition was applied to specimens of SAE 6434 and SAE 4130 steel as in Example I to give adherent coatings both before and after heat treatment at 1300° F. for one hour in an uncontrolled atmosphere. The adherency of the coatings was determined, as in previous examples, by placing masking tape on top of the coating and stripping off the masking tape.

In other of my compositions I employed a sequestering or chelating agent such as ethylenediamine tetraacetic acid. Such compounds are multifunctional in terms of my invention in that they are both colloidal agents and are also acids. Thus, when employed in my composition they take the place of both the acid and colloidal compound as, for example, the sulfuric acid and the polyvinyl alcohol or methyl cellulose as used in the preceding examples. Typical of such compositions were the following:

(1) 25 g. of copper sulfate pentahydrate, 10 g. ethylenediamine tetraacetic acid, and 100 cc. of water;
(2) 10 g. of copper sulfate pentahydrate, 5 g. of ethylenediamine tetraacetic acid, and 50 cc. of water; and
(3) 6.25 g. of copper sulfate pentahydrate, 10.7 g. of ethylenediamine tetraacetic acid, and 100 cc. of water.

The above compositions were found to give coatings on ferrous metal surfaces which were fairly resistant to heat treatment. However, these coatings are slightly inferior to those as set forth in the preceding examples in which both an acid and a colloidal material were present in the composition.

As shown by the preceding examples, my marking solution works very well in forming adherent marks on ferrous metal surfaces so as to identify the ferrous parts during heat treatment and thereafter. Although illustrated only with respect to specimens of SAE 4130 and SAE 6434 steel, my marking solutions work well in marking essentially any alloy containing a predominant amount of iron. Thus, when my marking solution is applied to a wide variety of iron-containing alloys, similar results are obtained to those set forth in the preceding examples.

The coatings formed from my marking solutions contain a large quantity of pure copper. Since copper is a relatively inert metal, the coatings or markings are quite resistant to oxidization. Thus, my marking solutions can also be used for coating various metal surfaces with a coating which is primarily copper. In this application, my compositions can be employed for forming decorative coatings, for forming coatings resistant to corrosion, etc. These uses for my composition are, of course, in addition to its principal use in marking ferrous metal articles as heretofore described.

Having fully defined my novel compositions and their use in marking or coating ferrous articles, I desire to be limited only within the lawful scope of the appended claims.

I claim:
1. A method for coating ferrous metal surfaces comprising cleaning said ferrous metal surface and applying thereto a marking composition comprising an effective amount up to about 20 percent by weight of copper sulfate, an acid in sufficient quantity to give a pH which is less than about 3.5, an effective amount of from about 0.1% based on the weight of polar solvent up to about 6 percent by weight of the total composition of a colloidal material sufficient to suppress gassing on contact of the marking composition with a ferrous metal, and a polar solvent.

2. The method of claim 1 wherein said acid is sulfuric acid.

3. The method of claim 2 wherein said colloidal material is polyvinyl alcohol.

4. The method of claim 2 wherein said colloidal material is methyl cellulose.

5. The method of claim 2 wherein said polar solvent is water.

6. A marking composition particularly adapted for marking ferrous metal articles by deposition of copper thereon, said composition consisting essentially of effective amount up to about 20 percent by weight of copper sulfate, an acid in sufficient quantity to give a pH of less than about 3.5, about 6 percent of polyvinyl alcohol and a polar solvent.

7. A marking composition particularly adapted for marking ferrous metal parts by deposition of copper thereon consisting essentially of an effective amount up to about 20 percent by weight of copper sulfate, sulfuric acid in sufficient quantity to give a pH which is less than about 3.5, about 6 percent of polyvinyl alcohol and water.

8. The composition of claim 6 wherein the acid is sulfuric acid.

9. The composition of claim 6 wherein the polar solvent is water.

10. The composition of claim 6 which includes in addition a wetting agent in an effective quantity up to about 0.5 percent by weight.

References Cited by the Examiner
UNITED STATES PATENTS

| | | | |
|---|---|---|---|
| 2,377,593 | 6/1945 | VandeBunte | 106—20 |
| 2,733,198 | 1/1956 | Nobel et al. | 204—52 |
| 2,769,775 | 11/1956 | Schloen et al. | 204—52 |
| 2,783,919 | 3/1957 | Ansell | 222—211 |
| 2,915,414 | 12/1959 | Hilemn | 106—1 |
| 3,089,182 | 5/1963 | Lofgren | 15—563 |

ROBERT F. WHITE, *Primary Examiner.*

JOHN R. SPECK, ALEXANDER H. BRODMERKEL, MORRIS LIEBMAN, *Examiners.*

J. CARSON, L. B. HAYES, *Assistant Examiners.*